United States Patent

Nonaka

[11] Patent Number: 5,848,301
[45] Date of Patent: Dec. 8, 1998

[54] CAMERA AND RANGE FINDER

[75] Inventor: Osamu Nonaka, Sagamihara, Japan

[73] Assignee: Olympus Optical Co., Ltd., Tokyo, Japan

[21] Appl. No.: 20,852

[22] Filed: Feb. 9, 1998

[30] Foreign Application Priority Data

Feb. 10, 1997 [JP] Japan ................................... 9-027001

[51] Int. Cl.⁶ ................................................ G03B 13/36
[52] U.S. Cl. .............................. 396/56; 396/96; 396/100; 396/106
[58] Field of Search .................................. 396/100, 104, 396/106, 56–59, 120, 96, 125–128; 356/3.14, 3.13, 3.02, 3.06, 3.07, 3.08

[56] References Cited

U.S. PATENT DOCUMENTS

| | | | |
|---|---|---|---|
| 4,230,400 | 10/1980 | Wick et al. ............................... | 396/100 |
| 4,324,464 | 4/1982 | Wick ....................................... | 396/100 |
| 4,385,817 | 5/1983 | Saito ....................................... | 396/106 |
| 4,592,638 | 6/1986 | Kaneda et al. ........................... | 396/106 |
| 4,672,189 | 6/1987 | Tsunekawa et al. . | |
| 4,760,418 | 7/1988 | Ishizaki et al. .......................... | 396/100 |
| 5,014,080 | 5/1991 | Miyadera .............................. | 396/106 X |
| 5,172,155 | 12/1992 | Kosaka .................................. | 396/106 X |
| 5,245,398 | 9/1993 | Ludden ................................ | 396/106 X |
| 5,666,568 | 9/1997 | Saito et al. .............................. | 396/100 |

*Primary Examiner*—W. B. Perkey
*Attorney, Agent, or Firm*—Pillsbury Madison & Sutro LLP

[57] ABSTRACT

A camera having a range finder in accordance with the present invention has a range finder comprising a CPU responsible for overall control, a range finding unit in which two light-receiving lenses, two sensor arrays, a switching circuit, and an integration circuit are incorporated, a light projection LED, and an AF IC. The switching circuit is used to change the destination of outputs of the sensor arrays to an A/D conversion circuit, whereby range finding is carried out in a passive AF mode. Moreover, the switching circuit is used to change the destination of outputs of one sensor array to the AF IC, whereby range finding is carried out in an active AF mode. According to the present invention, a compact and inexpensive camera having the ability to carry out range finding in two modes and capable of properly measuring a distance to any of objects lying in a wide area can be realized.

30 Claims, 9 Drawing Sheets

CAMERA AND RANGE FINDER

BACKGROUND OF THE INVENTION

1. Field of the Invention

The present invention relates to a range finder for measuring a distance to an object and a camera having the range finder.

2. Description of the Related Art

As a range finder for cameras, range finders for carrying out range finding for automatic focus (AF) and falling into an active type utilizing reference signal light projected from a camera to an object and a passive type utilizing information of a distribution of luminances of the object are well-known.

A range finder of the former type can measure a distance to even an object, which exhibits no distribution of luminances and appears as a low-contrast image, in a dark place, but is poor at dealing with an object that is lying at a far distance and does not reflect light. By contrast, a range finder of the latter type can measure both a far distance and near distance on a stable basis, but cannot measure a distance to an object appearing as a low-contrast image in principle. It has been thought that a range finder adopting both the methods would deal with even a difficult object at a considerably probability. However, both the methods have seldom been adopted in terms of cost and spaces. A photoelectric converter employed in a light-projection type range finder described in Japanese Examined Patent Publication No. 5-22843 (U.S. Pat. No. 4,672,189) is a well-known proposal for juxtaposing means for implementing the methods in a limited space.

The photoelectric converter disclosed in the Japanese Examined Patent Publication No. 5-22843 (U.S. Pat. No. 4,672,189) uses a sensor array for converting light into charges. Two rows of capacitors are included for accumulating the charges. Based on a difference in number of accumulated charges between when light used for range-finding is projected and when the range-finding light is not projected, signal light usable for active automatic focus is extracted. Furthermore, an image usable for active automatic focus is detected on the basis of the arrangement of accumulated charges in the sensor array.

However, according to the foregoing method implemented in the photoelectric converter, although the foregoing facility can be installed in one chip, two charge accumulating means are needed. Besides, the configuration is complex, and the scale of an integrated circuit is large. This poses a problem in terms of cost.

It is conceivable that a range finder has a sensor used for range finding for active automatic-focus (AF) arranged in a dead space on the light-receiving surface of a chip containing an integrated circuit (IC) that includes a sensor array used for range finding for passive AF. However, when the sensor for active AF occupy a larger area in the range finder, it becomes difficulty to place the IC on the chip.

SUMMARY OF THE INVENTION

The present invention attempts to solve the foregoing problems. An object of the present invention is to provide a compact and inexpensive range finder having the ability to carry out range finding in two modes and capable of measuring a distance to any of objects lying in a wider area.

A camera in accordance with the present invention includes a range finder that comprises two sensor arrays for detecting two luminance patterns in object images represented by incident light rays propagating along two optical paths, and an integrating means for integrating output signals of the sensor arrays, and that measures a distance to an object by comparing the two luminance patterns. The camera includes a switching means for isolating output signals of at least one of the two sensor arrays from the integrating means, and a detection circuit for detecting pulsated light current components in the output signals isolated by the switching means.

In the foregoing camera, the two sensor arrays are employed. Luminance patterns produced on the basis of the outputs of the sensor arrays are compared in order to measure a distance to an object. Moreover, output signals of at least one of the two sensor arrays can be isolated from the integrating means, and pulsated light current components can be detected by the detecting means.

A range finder in accordance with the present invention employs sensor arrays, comprises a switching means capable of bundling outputs of each of the sensor arrays as outputs of a plurality of light-receiving surfaces, a light projecting means for projecting signal light on an object, and a control means for controlling the switching means so as to switch a first range-finding, mode, in which outputs of each of the sensor arrays are detected in order to measure a distance to an object, and a second range-finding mode in which outputs provided by blocks, into which a sensor array is divided, when the light projecting means projects light are detected in order to measure a distance to an object.

In the range finder, the switching means is controlled in order to switch the first range-finding mode in which outputs of the sensor arrays are detected in order to detect a distance to an object, and the second range-finding mode in which outputs provided by the blocks, into which the sensor array is divided, when the light projecting means projects light are detected in order to measure a distance to an object.

Other objects and advantages of the present invention will be apparent from the description below.

DESCRIPTION OF THE PREFERRED EMBODIMENTS

Embodiments of the present invention will be described in conjunction with the drawings.

Figure 1:
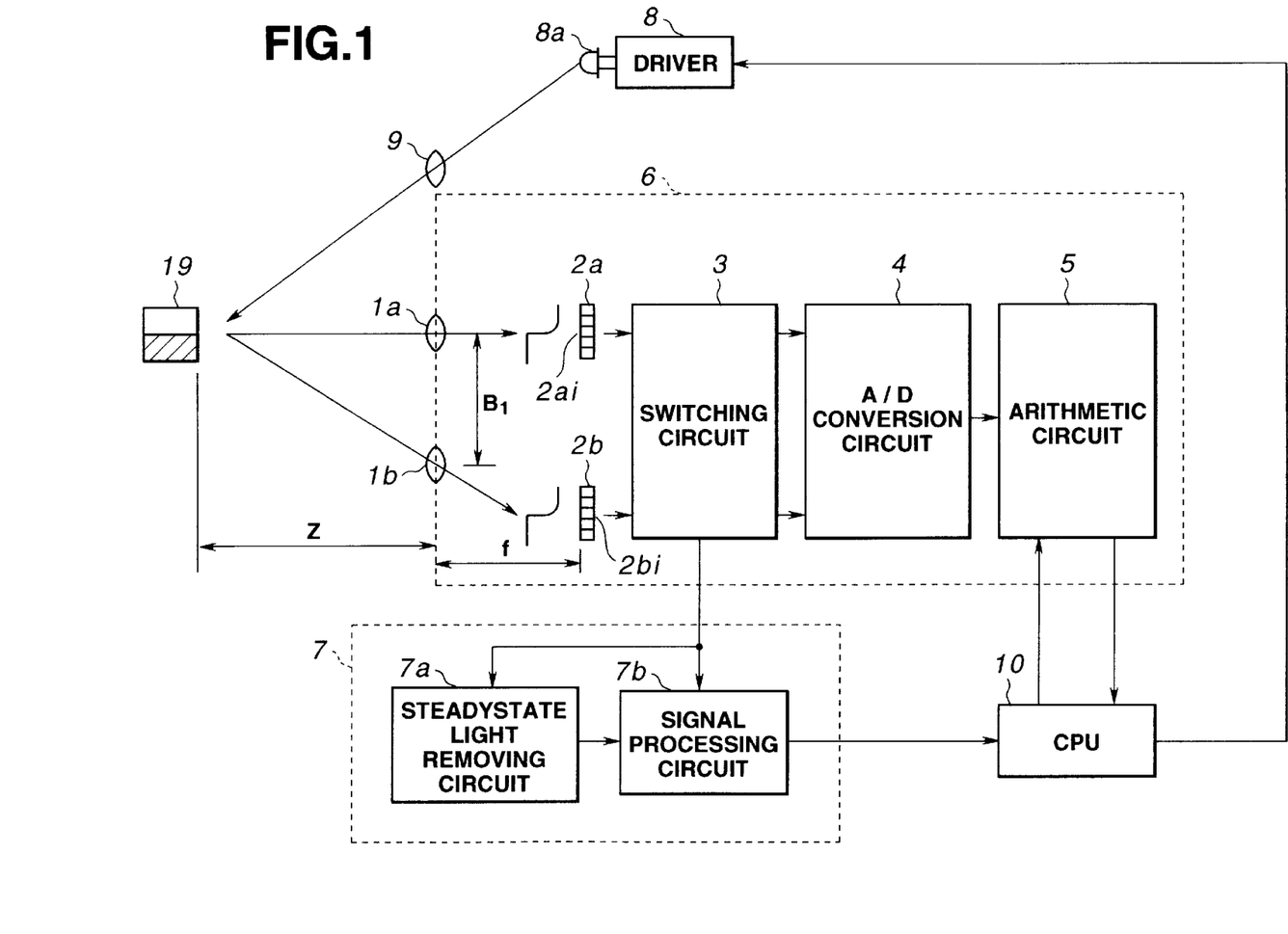
FIG. 1 is a block diagram showing the configuration of a major portion of a range finder for cameras in accordance with the first embodiment of the present invention.

FIG. 1 is a block diagram schematically showing a major portion of a range finder for cameras in accordance with the first embodiment of the present invention. The range finder in accordance with this embodiment comprises a CPU 10 that is a control means responsible for control of the whole range finder, a range finding unit 6 for acquiring light used for range finding and carrying out range finding, an LED driver 8 and light-emitting diode (LED) 8a serving as a light projecting means, and an automatic focus (AF) IC 7 serving as a detection circuit. The range finder can carry out range finding in a passive AF mode that is the first range-finding mode and an active AF mode that is the second range-finding mode.

In the range finder, when range finding is carried out in the passive AF mode, sensor arrays 2a and 2b designed for passive AF and incorporated in the range finding unit 6 are employed. The sensor arrays 2a and 2b acquire light reflected from an object 19. Outputs of sensor cells that are light-receiving elements constituting the sensor arrays are acquired via a switching circuit 3. An A/D conversion circuit 4 having an integration circuit that is an integrating means therein converts the outputs into an analog form. A magnitude of mismatch between the images on the sensor arrays 2a and 2b is then calculated by an arithmetic circuit 5. Based on the magnitude of mismatch between the images, a distance to an object is calculated.

By contrast, when range finding is carried out in the active AF mode, the LED 8a that is a light projecting means is allowed to glow. Pulsated signal light is projected on the object 19, and reflected light is acquired by the sensor array 2b that is one of the sensor arrays. Output lines extending from the sensor cells in the sensor array are disconnected from the integration circuit by means of the switching circuit 3 incorporated in the range finding unit 6. The outputs of the sensor cells are input as a bundle of outputs to the AF IC 7. Based on the information of an image of the object, a distance to the object is calculated according to a trigonometric range finding method. Based on the information of the distances to the object calculated in both the modes, a focusing lens is thrust to be focused on the object by means of a focus drive control unit that is not shown. The range finder will be explained in detail below.

As shown in FIG. 1, two light-receiving lenses 1a and 1b are interspaced by a base length B1 determining a parallax. The two sensor arrays 2a and 2b are placed at positions separated by a focal length f from the lenses.

In the passive AF mode, a distance to an object, Z, is calculated on the basis of a magnitude of mismatch between images of the object 19 on the sensor arrays 2a and 2b which is derived from the parallax and worked out using luminance patterns. Specifically, object light rays incident on the light-receiving lenses 1a and 1b fall on the sensor arrays 2a and 2b. Outputs of the sensor arrays 2a and 2b are input to the A/D conversion circuit 4 via the switching circuit 3 in units of a sensor cell, integrated, and then converted into a digital form. The distance of an object is calculated on the basis of the digital information.

By contrast, in the active AF mode, the light-emitting diode (LED) 8a serving as a light projecting means is allowed to glow in a pulsating manner by means of a driver 8. The pulsed light is converged by a light-projecting lens 9 and thus projected on the subject 19. Light emitted from the LED 8a and reflected from the object 19 falls on the sensor array 2b through the light-receiving lens 1b. At this time, outputs of the sensor cells of the sensor array 2b are input in a bundled form from the switching circuit 3 to the active AF IC 7 serving as a detection circuit. In other words, the outputs of the sensor array 2b are divided into two groups with respect to the center of the array, and then output in a bundled state by the switching circuit 3.

The AF IC 7 includes a steady-state light removing circuit 7a and a signal processing circuit 7b. Owing to the known operation of the steady-state light removing circuit 7a, light other than signal light incident in a steady state on the sensor array 2b, that is, a light current stemming from background light is removed. Only a pulsated light current component stemming from the signal light is processed by the signal processing circuit 7b. As mentioned above, owing to the switching circuit 3, output signals of a sensor array may be handled independently or may be handled in an integrated form.

When the active AF mode is selected, the output lines extending from the sensor array 2a are not connected to the AF IC 7. The sensor array therefore functions in the passive AF mode.

Next, referring to FIG. 1, a method of calculating a difference in relative position between luminance patterns, which is implemented in the range finder for calculation in the passive AF mode, will be explained in more detail. Since the light-receiving lenses 1a and 1b are interspaced by the base length B1, a difference in relative position between distributions of light incident on the sensor arrays 2a and 2b, x, varies depending on a distance to an object, Z. Assuming that the focal length of the light-receiving lenses is f, the distance to an object Z is expressed as follows:

$$Z = B1 \cdot f / x \qquad (1)$$

The sensors constituting the sensor arrays 2a and 2b output a current proportional to an amount of incident light. The outputs of the sensors are converted into digital signals by the A/D conversion circuit 4 including the integration circuit that is an integrating means for integrating the currents. The difference x can be calculated through correlation performed by the arithmetic circuit 5 for calculating a magnitude of mismatch between images. The result is input to the CPU 10 that is an arithmetic control means formed with a one-chip microcomputer or the like. The above expression is then calculated in order to work out the distance to an object Z. This is the basic principles of trigonometric range finding for passive AF. The foregoing configuration is the typical configuration of a passive AF type trigonometric range finder.

The foregoing facility for calculating a magnitude of mismatch, which is generally composed of two processes as described later, may be installed in the CPU 10. For example, if a camera is designed according to the present invention, in such a manner that when the camera is focused, a photographing focusing lens is controlled via an actuator such as a motor by the CPU 10 responsible for the operations of the camera, the camera can be provided as a camera with an AF function.

Mismatch calculation in which a magnitude of mismatch x is calculated will be described. To begin with, a process of calculating a mismatch between images on sensor arrays requires a correlation step of detecting a mismatch in units of a pitch between sensors, that is, a pitch between sensor cells, and an interpolation step of calculating a magnitude of mismatch at a finer resolution by carrying out interpolation.

Figure 2A:
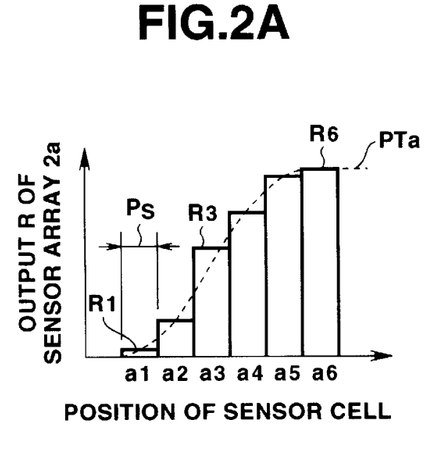
FIG. 2A shows a luminance pattern indicated by object light falling on one of sensor arrays included in the range finder shown in FIG. 1.
Figure 2B:
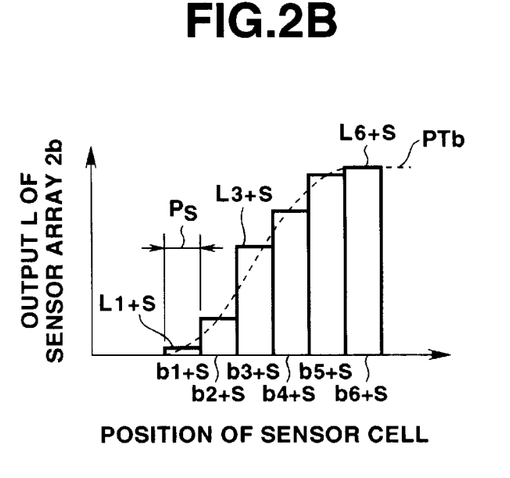
FIG. 2B shows a luminance pattern indicated by object light falling on the other sensor array included in the range finder shown in FIG. 1.

To begin with, the procedure of correlation will be described. FIGS. 2A and 2B are diagrams showing luminance patterns exhibited by light rays incident on the sensor arrays 2a and 2b, and outputs of the sensor cells constituting the sensor arrays. Assume that the right-hand sensor array or the sensor array 2a is composed of sensor cells a1 to a6 that are light-receiving elements. The subscripts 1 to 6 indicate absolute positions of the sensor cells ai with respect to the optical axis of the light-receiving lens 1a. Moreover, assume that the left-hand sensor array or the sensor array 2b is composed of sensor cells b1 to b6 and the subscripts 1 to 6 indicate absolute positions of the sensor cells bi with respect to the optical axis of the light-receiving lens 1b. Moreover, a pitch between sensor cells is Ps.

When light exhibiting a luminance pattern PTa shown in FIG. 2A falls on the sensor array 2a, the levels R1 to R6 of the outputs of the sensor cells a1 to a6 constituting the sensor array 2a show a distribution indicated with bars of the bar graph of FIG. 2A. When light exhibiting a similar luminance pattern PTb falls on the sensor array 2b, if the pattern of the outputs L1 to L6 of the sensor cells b1 to b6 matches the pattern of the outputs R1 to R6 without a mismatch, the magnitude of mismatch, x, is 0. The distance to an object, Z, is therefore infinite.

When an object lies at a limited distance, outputs L1+s, L2+s, etc., and L6+s of sensor cells b1+s, b2+s, etc., and b6+s whose positions are shifted by the number of sensor cells, s, are, as shown in FIG. 2B, provided in the same manner as the outputs R1 to R6 shown in FIG. 2A. The magnitude of mismatch, x, can be calculated using the number of sensor cells to be shifted, s.

For calculating the number of sensor cells to be shifted, s, an output L of a sensor cell is subtracted from an output R of a corresponding sensor cell. The sum FF of absolute values of such differences calculated relative to sensor cells is employed. Outputs L(i) of the sensor cells of the left-hand sensor array are subtracted from outputs R(i) of the corresponding sensor cells of the right-hand sensor array. The number of outputs, i, is varied within a certain range. The absolute values of differences are added up, thus calculating a sum FF(i). That is to say, $$FF(i) = \Sigma |R(i) - L(i)|$$

Thereafter, either the positions of the right-hand sensor cells providing the outputs Ri or the positions of the left-hand sensor cells providing the outputs Li are shifted by one cell. Differences of the outputs of the sensor cells at the next positions from their corresponding sensor cells are calculated in the same manner as those of the adjoining sensor cells. The sum FF(i+1) of the differences is expressed as follows:

$$FF(i+1) = \Sigma |R(i+1) - L(i)|$$

Figure 3:
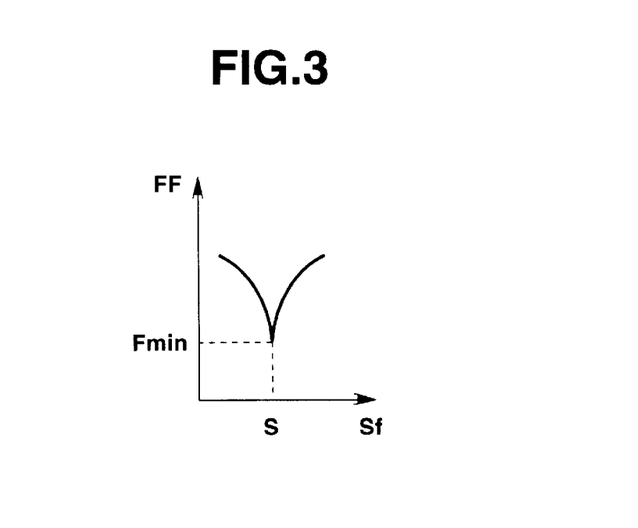
FIG. 3 is a graph indicating a change in sum FF of differences between outputs of two sensor arrays in the range finder shown in FIG. 1.

A change in value FF obtained by sequentially varying the magnitude of shift Sf is, as shown in FIG. 3, plotted as a curve of the value FF varying depending on the magnitude of shift SF. This change is provided as an example in relation to a certain object. In the case of FIG. 3, it is thought that when the sum FF of differences between the outputs R and outputs L assumes a minimum value Fmin and the magnitude of shift Sf assumes a value S, the outputs of the right-hand and left-hand sensor arrays 2a and 2b are most consistent with each other. The magnitude of shift Sf is regarded as a magnitude of shift or the number of sensor cells to be shifted, s.

When the positions of sensor cells of one of the sensor arrays 2a and 2b are shifted by the magnitude of shift s, the distributions of outputs of the sensor arrays 2a and 2b, that is, the distribution of outputs R discriminated by subscripts of sensor cells ai, of which positions are not shifted, of the sensor array 2a, and the distribution of outputs L discriminated by subscripts of sensor cells bi+s, of which positions are shifted by the magnitude of shift s, of the sensor array 2b provide the luminance patterns shown in FIGS. 2A and 2B.

For calculating the magnitude of mismatch x at a finer resolution on the basis of the magnitude of shift s, interpolation must be carried out. In practice, the magnitude of mismatch between images on the two sensor arrays 2a and 2b does not correspond exactly to a multiple of a pitch between sensor cells. For more precise range finding, the magnitude of mismatch between images must be detected at a higher level of precision at which the magnitude of mismatch is detected in units of a value smaller than the pitch between sensor cells. This process is referred to as interpolation and will be described below in conjunction with FIG. 4 showing the outputs of the sensor arrays.

Figure 4:
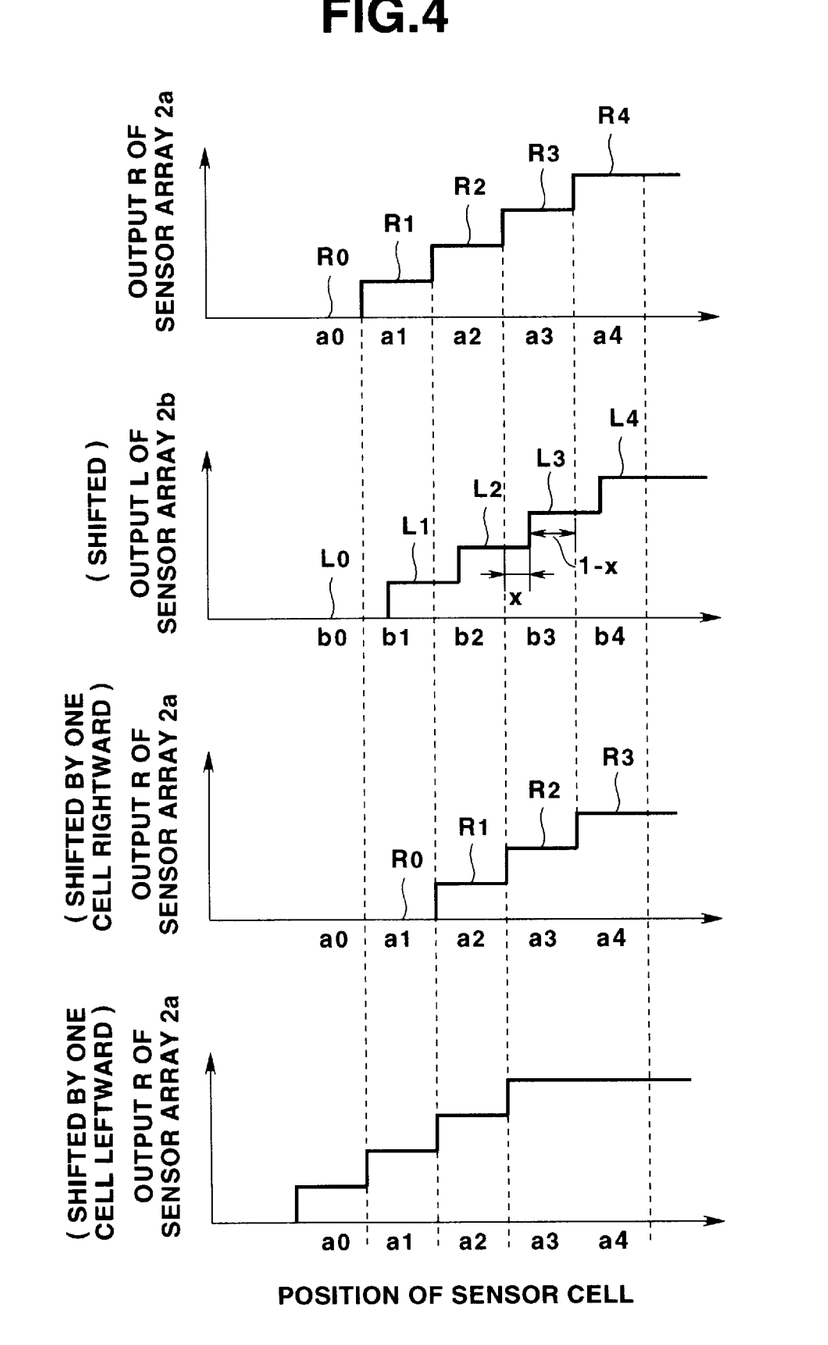
FIG. 4 is a diagram indicating outputs of sensor cells, of which positions are shifted, in the two sensor arrays in the range finder shown in FIG. 1.

Outputs R and outputs L in FIG. 4 are outputs of parts of the sensor cells constituting the sensor arrays 2a and 2b shown in FIG. 1, and have already undergone the above correlation. The outputs provided by shifting the positions of sensor cells by the magnitude of shift s are graphically shown in rows for easy comparison. Strictly speaking, outputs L0 to L4 in FIG. 4 should be described as outputs Ls to Ls+4 in relation to the shifted positions of sensor cells. For brevity's sake, the subscript of s denoting the magnitude of shift s is omitted.

As shown in FIG. 4, the outputs L of sensor cells of the left-hand sensor array 2b, of which positions are shifted by the magnitude of shift s, are deviated from the reference outputs R of the right-hand sensor array 2a. That is to say, light incident on the left-hand sensor array is deflected by a distance x from light incident on the right-hand sensor array. At this time, for example, light rays incident on sensor cells a0 and a1 providing outputs R0 and R1 fall in a mixed form on a sensor cell b1 providing an output Li. Likewise, light rays deflected by the distance x from sensor cells providing reference outputs R fall successively on sensor cells bi providing outputs Li. The outputs Li are therefore expressed as follows:

$$L1 = (1-x) \cdot R1 + x \cdot R0$$

$$L2 = (1-x) \cdot R2 + x \cdot R1$$

$$L3=(1-x)\cdot R3+x\cdot R2 \quad (2)$$

When the minimum value Fmin, and values F(−1) and F(+1) of the sum FF of differences of outputs of sensor cells, of which positions are shifted by one sensor cell in positive and negative directions, from outputs of sensor cells whose positions are not shifted are expressed using outputs Rn and Ln, the expressions (3) are provided.

$$Fmin=\Sigma|Rn-Ln|$$
$$F(-1)=\Sigma|Rn-1-Ln|$$
$$F(+1)=\Sigma|Rn+1-Ln| \quad (3)$$

When the expressions (3) are developed using the expressions (2), the expressions (4) are obtained:

$$\begin{aligned}
F\min &= |R1-L1|+|R2-L2|+|R3-L3| \quad (4)\\
&= |R1-(1-x)\cdot R1-x\cdot R0|+|R2-(1-x)\cdot R2-x\cdot R1|+|R3-(1-x)\cdot R3-x\cdot R2|\\
&= x\cdot|R1-R0|+x\cdot|R2-R1|+x\cdot|R3-R2|\\
&= x\cdot\{|R1-R0|+|R2-R2|+|R3-R2|\}\\
F(-1) &= |R0-L1|+|R1-L2|+|R2-L3|\\
&= |R0-(1-x)\cdot R1-x\cdot R0|+|R2-(1-x)\cdot R2-x\cdot R1|+|R2-(1-x)\cdot R3-x\cdot R2|\\
&= |(1-x)\cdot(R0-R1)|+|(1-x)\cdot(R1-R2)|+|(1-x)\cdot(R2-R3)|\\
&= (1-x)\cdot\{|R0-R1|+|R1-R2|+|R2-R3|\}\\
F(+1) &= |R2-L1|+|R3-L2|+|R4-L3|\\
&= |R2-(1-x)\cdot R1-x\cdot R0|+|R3-(1-x)\cdot R2-x\cdot R1|+|R4-(1-x)\cdot R3-x\cdot R2|\\
&= x\{|(R1-R0)+(R2-R1)|+|(R3-R2)|\}+|R2-R1|+|R3-R2|+|R4-R3|
\end{aligned}$$

approximately
$$= (1+x)\cdot\{|(R0-R1)|+|R1-R2|+|R2-R3|\}$$

where $|R1-R0|$ is approximate to $|R4-R3|$.

When $\{|(R0-R1|+|R1-R2|+|R2-R3|\}$ in the expressions (4) is replaced with $(\Sigma\Delta R)$, the following expressions are provided:

$$Fmin=x\cdot(\Sigma\Delta R)$$
$$F(-1)=(1-x)\cdot(\Sigma\Delta R)$$
$$F(+1)=(1+x)\cdot(\Sigma\Delta R)$$

Consequently, the expression (5) below is obtained as an expression defining the relationship between the value F and magnitude of mismatch x.

$$\begin{aligned}
\frac{(F(-1)-Fmin)}{(F(+1)-Fmin)} &= \{(1-x)\cdot(\Sigma\Delta R)-(\Sigma\Delta R)\}/\{(1+x)\cdot(\Sigma\Delta R)-x\cdot(\Sigma\Delta R)\} \quad (5)\\
&= (1-2\cdot x)\cdot(\Sigma\Delta R)/(\Sigma\Delta R)\\
&= (1-2\cdot x)
\end{aligned}$$

Using the expression (5), the magnitude of mismatch x can be calculated on the basis of the values Fmin, F(−1), and F(+1). This calculation is interpolation that is carried out by the arithmetic circuit 5 shown in FIG. 1. Alternatively, a given program may be installed in the CPU 10 serving as an arithmetic control means, such as, a one-chip microcomputer.

Next, range finding to be carried out by the range finder in the active AF mode will be explained in more detail.

Figure 5:
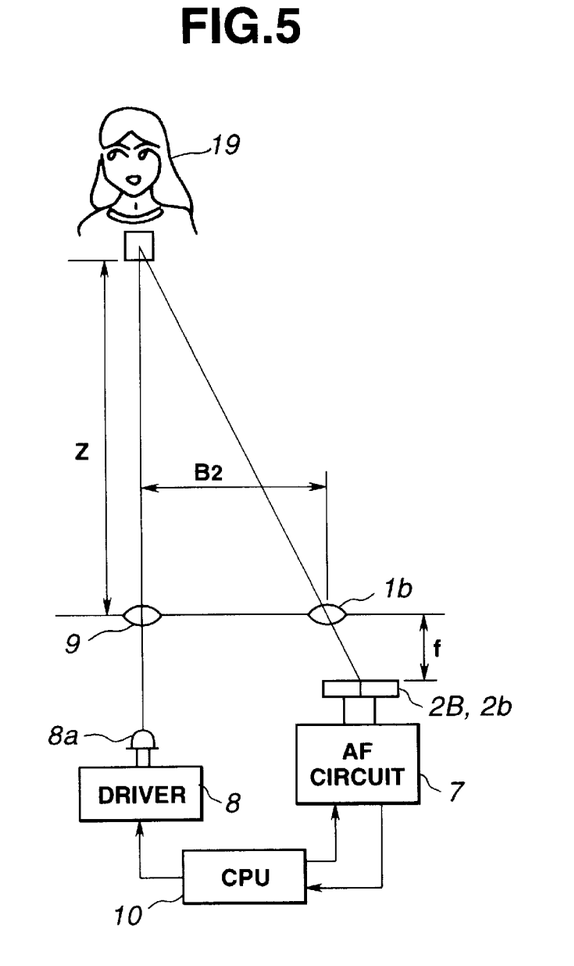
FIG. 5 is a diagram showing the principles of range finding for active AF in a known range finder and the range finder shown in FIG. 1.

Prior to the description of the range finding to be carried out by the range finder of this embodiment in the active AF mode, a mention will be made of known range finding for active AF. FIG. 5 is a diagram showing the principles of range finding for active AF. The description will proceed on the assumption that a bisected sensor 2B is substituted for the sensor array 2b included in the range finder in accordance with this embodiment. Specifically, the LED 8a projects pulsed light for use in ranging finding on the subject 19 through the light-projecting lens 9. Reflected signal light that is the range finding light reflected from the object 19 falls on the bisected sensor 2B through the light-receiving lens 1b. Since the signal light is pulsed light, the AF IC 7 separates the signal light from background light incident on the sensor in a steady state in terms of a difference in frequency or timing.

Figure 6:
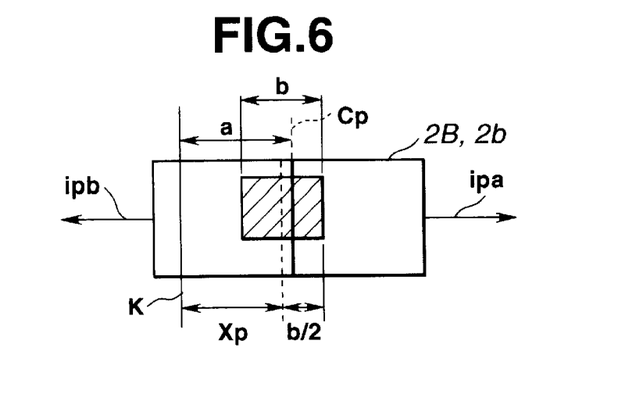
FIG. 6 is a diagram showing a spot beam of reflected signal light converged on a bisected sensor according to the principles of range finding for active AF shown in FIG. 5.

FIG. 6 is a diagram showing a spot beam Sp of reflected signal light converged on the bisected sensor 2B which has a width b. Assuming that a distance to an object is Z, an interspace between the light-projecting lens and light-receiving lens is B2, and the focal length of the light-receiving lens is f, the center of the spot beam Sp falls on a position xp having the following relationship:

$$xp=B2\cdot f/Z \quad (6)$$

Moreover, the spot beam Sp having the width b falls on with a position away by a distance xp from a reference point K at a center, and the bisected sensor 2B outputs a light current proportional to the area of the spot beam Sp. At this time, two light currents ipa and ipb have the following relationships:

$$ipa=ip\cdot(xp+b/2-a)/b$$
$$ipb=ip\cdot(-xp+b/2+a)/b \quad (7)$$

wherein a denotes a distance from the reference point K to a division point Cp of the bisected sensor array 2a, and ip denotes a total signal light current. The sum of the light currents ipa and ipb equals to the light current ip.

When the two light current signals are calculated according to the expression of ipa/(ipa+ipb) by means of the AF IC 7, a signal that depends on the position xp according to the expression (xp+b/2−a)/b is produced. Since the values a and b are constants, when the produced signal is input to the CPU 10, the distance to an object Z can be calculated according to the expression (6).

When the range finder of this embodiment carries out range finding in the active AF mode, the sensor array 2b is used as the bisected sensor 2B included in the known range finder. The range finder of this embodiment includes the same components as those of the known range finder shown in FIG. 5 except the sensor array 2b and the switching circuit 3 for switching the destinations of outputs of the sensor array 2b. Specifically, the LED 8a and light-projecting lens 9 serving as a light-projecting means is used to project pulsed light for range finding on the object 19. Furthermore, the light-receiving lens 1b through which signal light reflected from the object 19 is acquired and the AF IC 7 for separating the reflected signal light as pulsed signal light and carrying out range finding are included.

Figure 7:
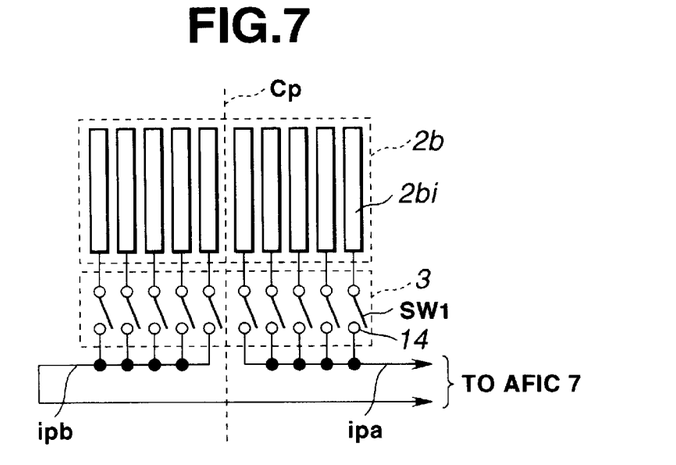
FIG. 7 is a circuit diagram of a sensor array and selection switches included in the range finder shown in FIG. 1.

In the range finder, as shown in FIG. 7 of the circuit diagram showing connections in the sensor array, outputs of the cells constituting the sensor array 2b are divided into two groups with respect to the division point Cp, bundled by the switching circuit 3, and output as light currents ipa and ipb to the AF IC 7. Owing to this configuration, as long as the pitch between cells in the sensor array is small enough, even if the outputs of the sensor cells constituting the sensor array divided into two groups as shown in FIG. 7 are bundled, the same advantage as that provided by the prior art employing the bisected sensor 2B can be provided.

To be more specific, in the active AF mode, the switching circuit 3 is used to bundle the outputs of the sensor array 2b so that two light currents like those provided by the bisected sensor 2B can be output. Thus, when the same signal processing is carried out, a signal dependent on the distance xp from the reference position K to the center of the spot beam can be produced according to the expression (7) and the distance to an object Z can be calculated according to the expression (6).

In the range finder of this embodiment, by controlling the on and off states of the switching circuit 3, the outputs of the sensor array 2b also used for range finding in the passive AF mode can be bundled as shown in FIG. 7 in the active AF mode so that the light currents ipa and ipb can be output. Thus, when the on and off states of a switch are controlled, the same sensor array can be used to carry out range finding in both the passive AF mode and active AF mode.

When a camera to which the range finder is adapted carries out automatic focus (AF), if an object lies, for example, at a far distance, the distance to the object calculated in the passive AF mode is adopted. If the object is likely to appear as a low-contrast image or exhibits a low luminance, the distance to the object calculated in the active AF mode is adopted. Based on the adopted distance, the focusing lens is driven to an in-focus position. The luminance of an object may, needless to say, be detected by means of a known photometry means. Alternatively, the luminance may be detected on the basis of an output of the range finding unit 6.

As mentioned above, the range finder for cameras according to this embodiment can carry out range finding in both the active AF mode and passive AF mode. For measuring, for example, a distance to a dark scene or a scene likely to appear as a low-contrast image which is an object difficult to deal with in the passive AF mode, the mode is changed to the active AF mode so that high-precision range finding can be carried out reliably. Moreover, since the same sensor array is used in different forms in the two Af modes, a compact design and low cost can be realized.

Figure 8:
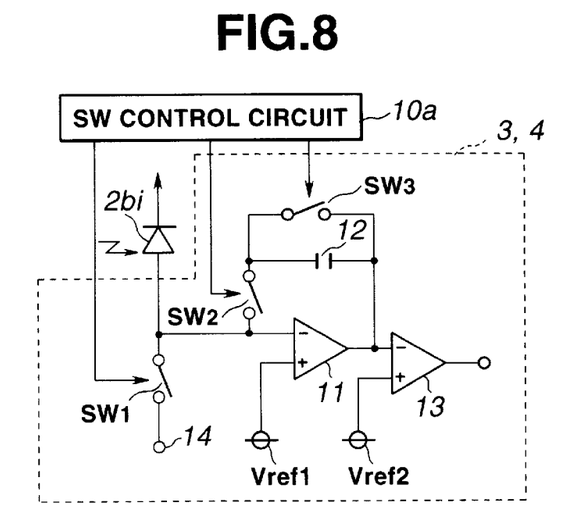
FIG. 8 is a circuit diagram showing a switching circuit and A/D conversion circuit included in the range finder shown in FIG. 1 in relation to a sensor cell.
Figure 9:
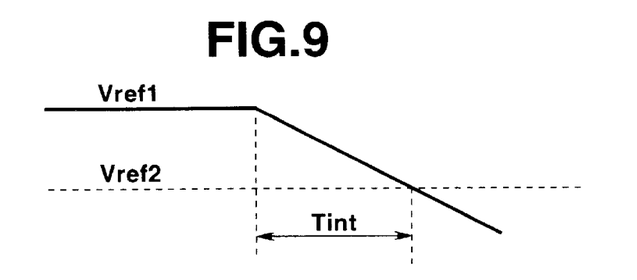
FIG. 9 is a diagram showing the waveform of an output of the A/D conversion circuit shown in FIG. 8.

Using the circuit diagram of FIG. 8 and the waveform chart of FIG. 9 showing the waveform of an output of an amplifier, an example of a method of converting an output of each sensor cell in a sensor array into a digital form in the passive AF mode, which is implemented in the range finder of the above embodiment, will be described. FIG. 8 is the circuit diagram showing in detail a sensor cell 2bi that is one of light-receiving elements constituting the sensor array 2b shown in FIG. 1, the switching circuit 3 for switching the destinations of the output of the sensor cell 2bi, and the A/D conversion circuit 4 including the integration circuit.

The subsequent description is concerned with A/D conversion of outputs of the left-hand sensor array 2b. The same A/D conversion is carried out in relation to the other right-hand sensor array 2a. However, a selection switch SW1 and terminal 14, which will be described later, for use in selecting the active AF mode are not included in the right-hand sensor array 2a.

The light-receiving sensor cell 2bi of the sensor array 2 outputs a light current proportional to the intensity of incident light. When a switch (SW) control circuit 10a incorporated in the CPU 10 is used to turn off the selection switch SW1 of the switching circuit 3 and turn on a selection switch SW2 thereof, the light current is integrated and converted into a voltage owing to the operations of an integration amplifier 11 and integration capacitor 12 which use a first reference voltage Vref1 as a reference voltage. An output is input to a comparator 13 and compared with a second reference voltage Vref2.

Prior to the start of the integration, the switch control circuit 10a turns on a selection switch SW3. Thereafter, when the selection switch SW3 is turned off, an output of the integration amplifier 11 is, as shown in FIG. 9, set to the reference voltage Vref1. Thereafter, as mentioned above, an integral voltage varies depending on the level of a light current, that is, the intensity of light. The comparator 13 judges a time interval Tint required for the integral voltage to reach the reference voltage Vref2. When incident light is intense, the time interval Tint is short. When the incident light is feeble, since integration is carried out slowly, the time interval Tint is long.

As mentioned above, when the time interval Tint required for the integral voltage to reach the reference voltage Vref2 is calculated for the output of each sensor cell 2bi, the intensity of light incident on each sensor cell 2bi is detected in a digital form. Consequently, a signal indicating the state of an object can be produced. When the capacitance of the integration capacitor 12 is changed from one to another using another switch, the speed of integration can be controlled in order to change sensitivity from one level to another according to light reflected from a wide area.

By contrast, when range finding is carried out in the active AF mode, the selection switch SW2 is turned off and the selection switch SW1 is turned on. In this state, a light current is output through the terminal 14. The terminals 14 are grouped as shown in the circuit diagram of FIG. 7, and connected to the AF IC 7 having the aforesaid ability. Thus, when the LED projects light for range finding, reflected signal light can be detected.

Next, a range finder in accordance with the second embodiment of the present invention will be described.

Figure 10:
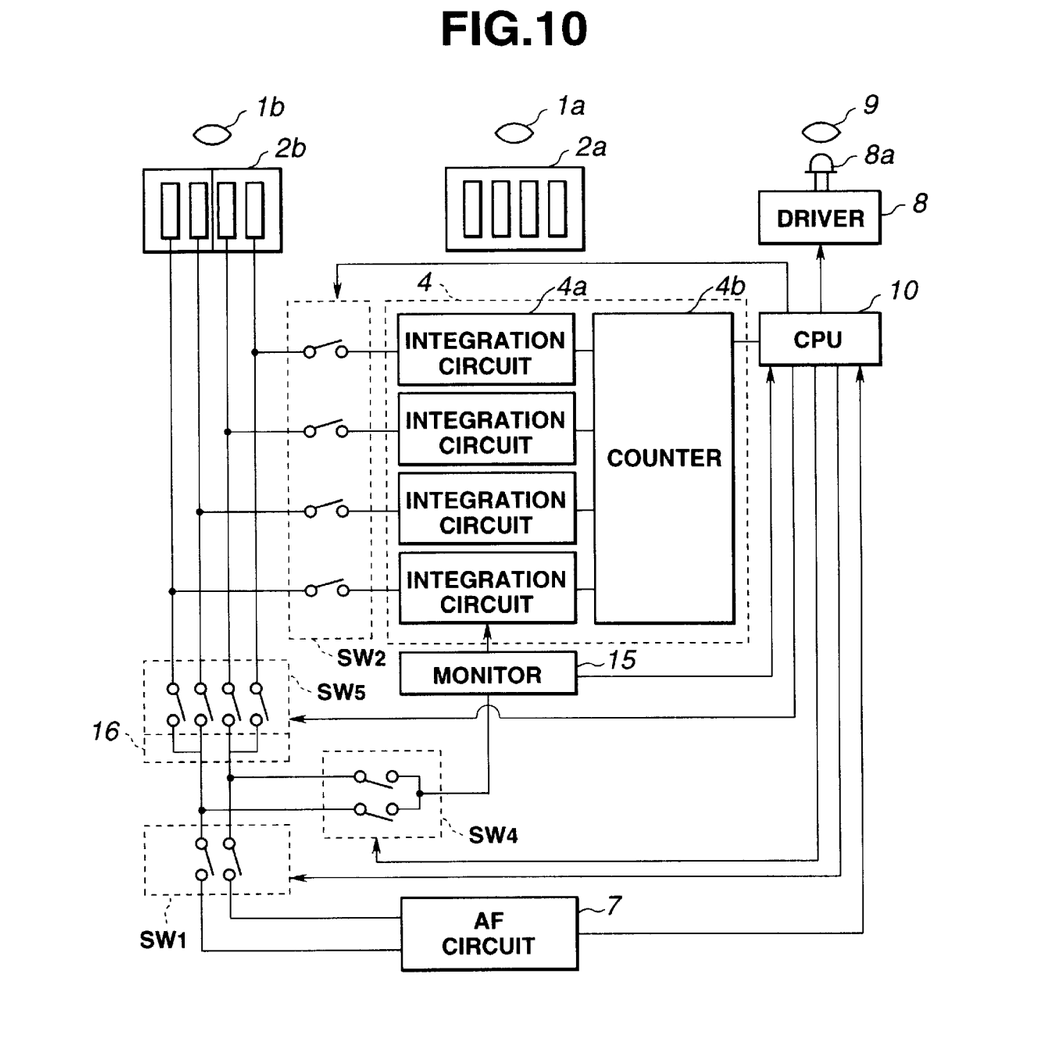
FIG. 10 is a block diagram showing a major portion of a range finder in accordance with the second embodiment of the present invention.

FIG. 10 is a block diagram showing a major portion of the range finder of this embodiment. In the range finder, when the passive AF mode is designated, a selection switch SW2 is turned on, and the outputs of sensor cells constituting a sensor array 2b are integrated. Consequently, a range finding signal for passive AF is produced. In the active AF mode, an LED 8b driven by a driver 8 projects pulsed signal light for range finding on an object. Reflected light is supplied to the sensor array 2b. When a selection switch SW5 is turned on, the outputs of the sensor cells of the sensor array 2b are bundled in twos by a connection circuit 16 in which a connection pattern is set. Light currents output from the sensor cells are added up. When a selection switch SW1 is turned on, additive light currents, that is, the light currents ipa and ipb shown in FIG. 6 are input to an AF IC 7. The AF IC 7 then executes range finding in the active AF mode. This configuration is substantially identical to that of the range finder in accordance with the first embodiment. The same reference numerals are assigned to the same components.

The outputs of sensor cells of a sensor array 2a are also integrated one by one, through they are not shown in FIG. 10. However, in the active AF mode, output lines extending from the sensor array 2a are not connected to the AF IC 7. As mentioned above, the sensor array 2a functions only in the passive AF mode.

In the range finder of this embodiment, the selection switch SW5 is turned on and the selection switch SW4 is turned on. This enables input of a total light current to a monitor circuit 15. The monitor circuit 15 can control the gain of an integration circuit, that is, the monitor circuit checks the level of the total light current to judge the intensity of light for range finding, changes the capacitance of the capacitor of an integration circuit 4a so as to change the level of sensitivity or control integration. Since a total light current is thus monitored for controlling integration, optimal integration can be carried out according to the state of an object or a scene. Whether the object is bright or dark, a digitized output can be obtained on a stable basis. Moreover, an output of the monitor circuit 15 is also input to a CPU 10.

For controlling integration, instead of changing the capacitance of the capacitor, the level of a clock based on which a counter 4b counts pulses to measure an integration time Tint may be changed, or a difference between the reference voltages Vref1 and Vref2 may be changed. Unless this changing is carried out, when an object is dark, the integration time may be so long as to cause a time lag. When the object is bright, the outputs of all sensor cells may be integrated immediately and an image signal may be saturated. In this case, range finding cannot be carried out. However, as mentioned above, since the monitor circuit 15 is used to control integration, high-precision range finding can be carried out for various scenes in the passive AF mode.

Integration of the output of each sensor cell has been described in conjunction with FIG. 8. Even in the range finder of this embodiment, an integrating means associated with each sensor cell has the same configuration. Specifically, the counter 4b counts pulses so as to define the integration time Tint. These integration circuits and counter are included in the A/D conversion circuit 4 shown in FIG. 10.

Figure 12:
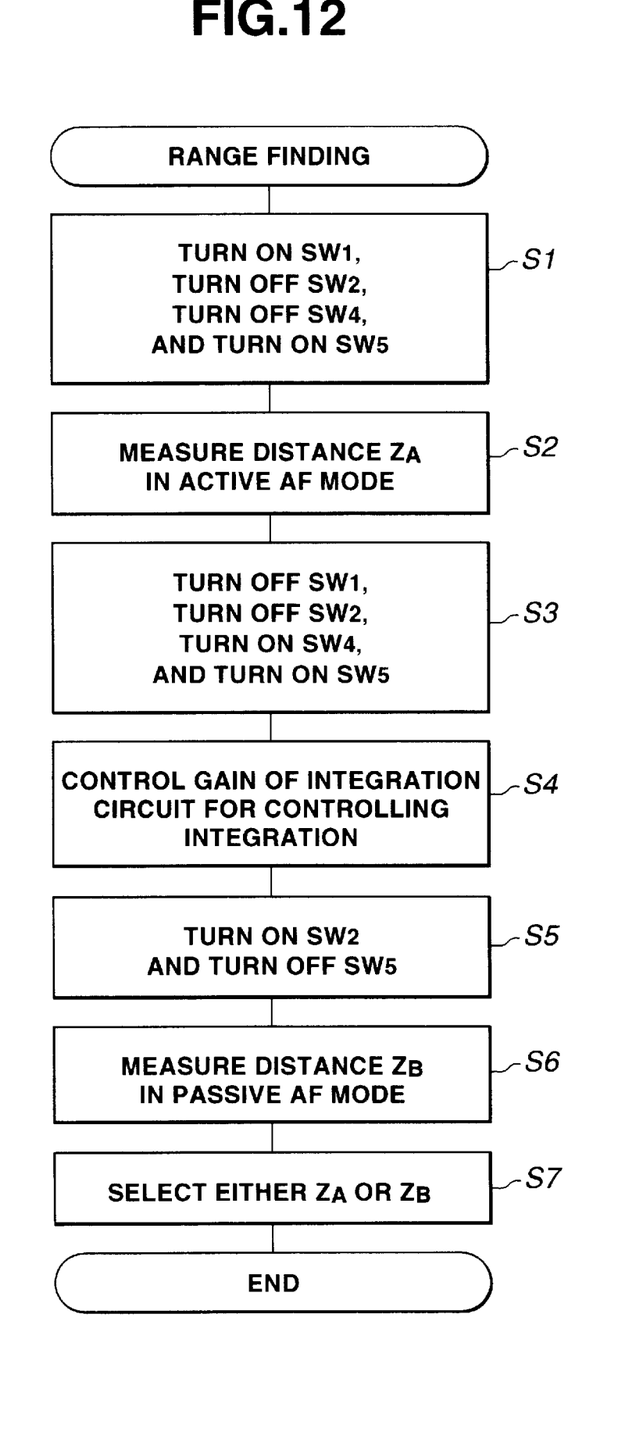
FIG. 12 is a flowchart describing range finding performed by the range finder shown in FIG. 10.

Next, range finding to be performed by the range finder of this embodiment having the foregoing configuration will be described in conjunction with the flowchart of FIG. 12. First, at step S1, the selection switches are controlled. That is to say, the selection switches SW2 and SW4 are turned off, and the selection switches SW1 and SW5 are turned on. At step S2, range finding for the active AF mode based on the principles of active trigonometric range finding shown in FIG. 5 is executed. Specifically, the LED 8b is allowed to glow with the selection switches brought to the above on and off states. Outputs of two blocks into which the sensor array 2b is divided are input to the AF IC 7, whereby a distance to an object, $Z_A$ is calculated.

At step S3, the selection switches SW1 and SW2 are turned off, and the selection switches SW4 and SW5 are turned on. At step S4, integration control or changing which has been described previously is carried out on the basis of a total amount of light. At step S5, the selection switch SW2 is turned on and the selection switch SW5 is turned off. At step S6, range finding for the passive AF mode is carried out. In other words, integral outputs of the sensor array 2b which are light currents are converted into a digital form, whereby a distance to an object, $Z_B$, is calculated in the passive AF mode.

Finally, at step S7, the distance to an object, $Z_A$, resulting from range finding for active AF is compared with the distance to an object, $Z_B$, resulting from range finding for passive AF, and either of the distances is selected as a distance used for focusing a camera. A selecting procedure is, for example, such that when an object is dark, the distance to an object, $Z_A$, resulting from range finding for active AF is selected, and that when the object is bright, the distance to an object, $Z_B$, resulting from range finding for passive AF is selected. Alternatively, the foregoing range finding may be carried out twice in each AF mode, and a distance to an object of which value is stable may be adopted.

Whether an object is bright or dark can be judged on the basis of an output of the monitor circuit 15.

As mentioned above, the range finder of this embodiment includes the monitoring means. The on or off states of the selection switches are changed so that the integration time or an integral voltage used for judgment can be adjusted properly according to the brightness of an object or the contrast of an object image. Consequently, a range finder having difficulty in dealing with a smaller number of scenes can be realized.

The range finding method for active AF need not be limited to the trigonometric range finding. Depending on the intensity of reflected signal light, a range finding method for AF in which a far distance or near distance is judged on the basis of an amount of reflected light may be adopted. For carrying out AF on the basis of an amount of reflected light, instead of dividing the sensor array 2b into two blocks, a total light current to be input to the monitor circuit 15 may be input to the AF IC 7. Alternatively, an output of a specific sensor alone may be selected.

Figure 11:
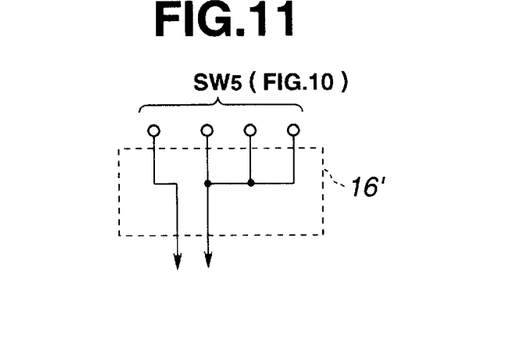
FIG. 11 is a diagram showing a variant of a connection circuit included in the range finder shown in FIG. 10.

In the range finder of this embodiment, when range finding is executed in the active AF mode, outputs of the sensor array 2b are provided in such a manner that the connection circuit 16 is used to equally divide the outputs into two groups and then bundle outputs belonging to the two groups. Instead of dividing the sensor array 2b simply into two portions, as shown in FIG. 11, a connection circuit 161 may be used to unequally divide the outputs. For example, when an IC chip for the sensor array 2b is designed so that aluminum wires can be linked to different sensor cells, the freedom in designing can be expanded. In this case, a layout of circuit elements enabling selection of any of various patterns of aluminum wires should preferably be adopted for an IC.

Next, a range finder in accordance with the third embodiment of the present invention will be described.

Figure 13:
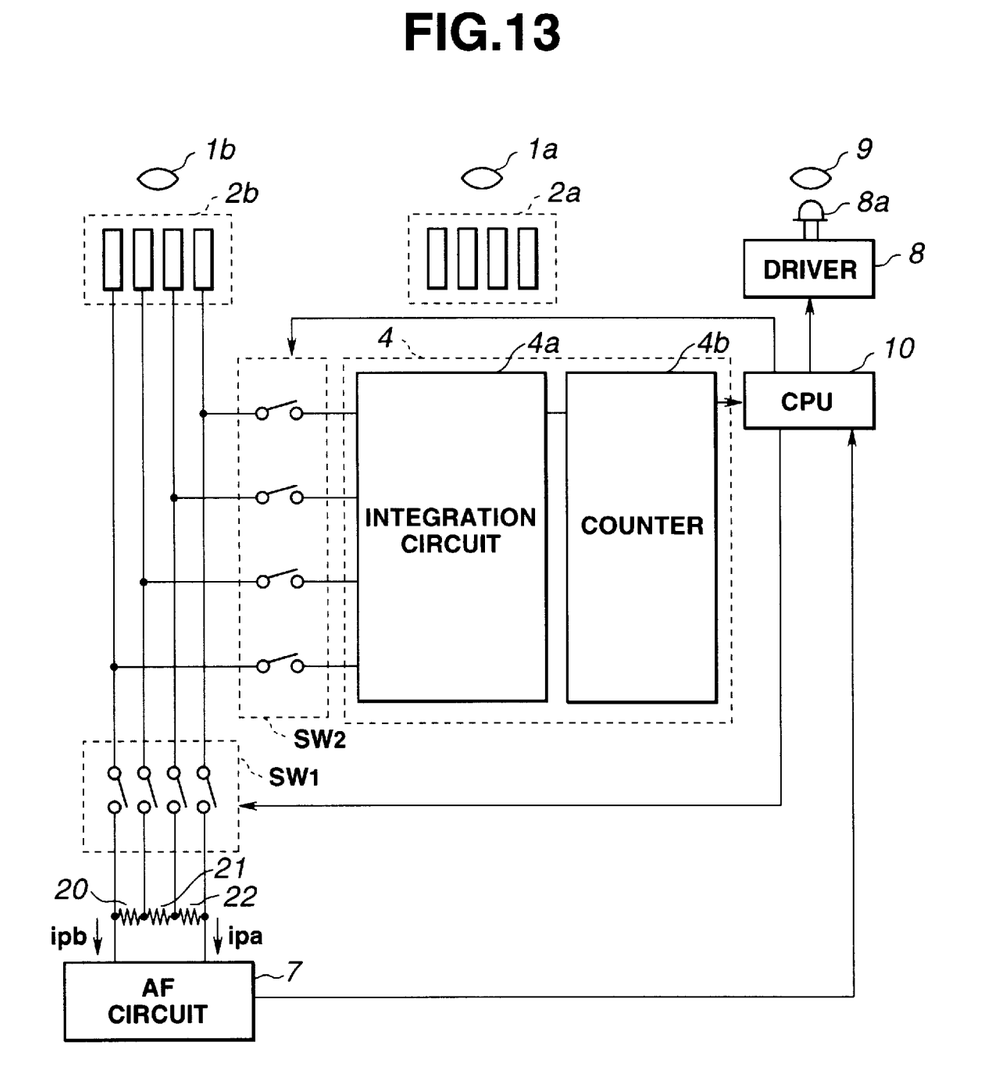
FIG. 13 is a block diagram showing a major portion of a range finder in accordance with the third embodiment of the present invention.

FIG. 13 is a block diagram showing a major portion of the range finder of this embodiment. In this range finder, resistors 20, 21, and 22 for dividing the level of a current are inserted to output lines extending from sensor cells of a sensor array 2b on a stage succeeding a selection switch SW1 to be controlled by a CPU 10.

In the case of the range finder having the foregoing configuration, when range finding for active AF is carried out, if the most intense ray of reflected signal light originating from an LED 8a falls on, for example, the second leftmost sensor cell of the sensor array 2b, the level of a light current output from the sensor array 2b is divided according to a resistance ratio determined by the inclusion of the resistors 20, 21, and 22. Specifically, when the resistances of the resistors 20, 21, and 22 are the same, the level of a signal light current ipa is a half of that of a signal light current ipb according to a resistance ratio of a resistance existent from a terminal associated with the sensor cell to one output terminal to a resistance existent from the terminal to the other output terminal. Moreover, when light falls on the second rightmost sensor cell of the sensor array 2b, the level of the light current ipa is a double of that of the light current ipb. Owing to the foregoing configuration, the inicident position of light can be converted into two sigal currents, and the sensor array 2b can be functioned in the same manner as an optical position sensing device (PSD) that is well-known as a general light-receiving device for range finding for active AF.

When the LED 8a glows, an AF IC 7 calculates a ratio of the signal light current ipa to the signal light current ipb. Thus, the incident position of reflected signal light on the sensor array 2b can be detected. This range finder has substantially the same components as the range finder in accordance with the first embodiment except that the resistors for dividing the level of a current are included.

Figure 14:
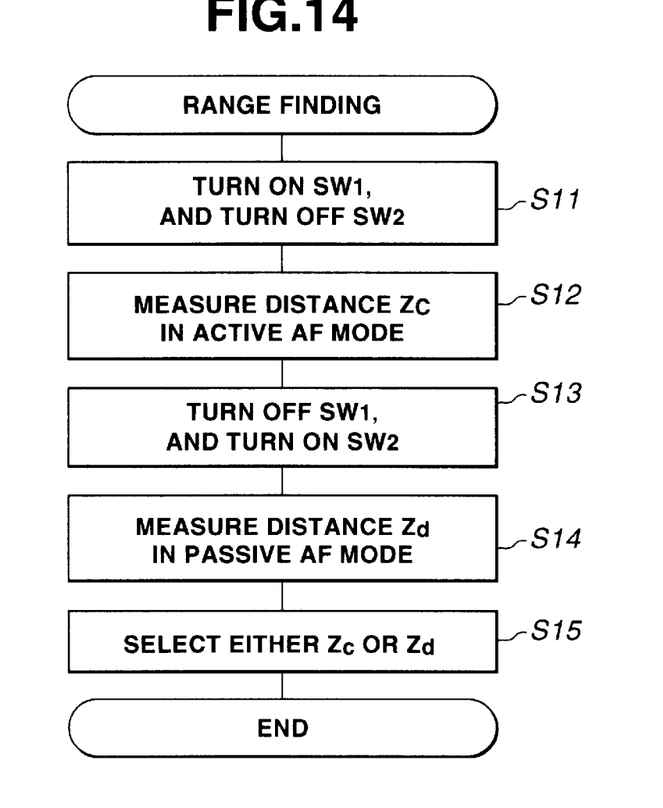
FIG. 14 is a flowchart describing range finding performed by the range finder shown in FIG. 13.

FIG. 14 is a flowchart describing range finding performed by the range finder. At step S11, the selection switch SW1 is turned on and a selection switch SW2 is turned off. This brings the sensor array 2b to a state in which the sensor array functions as a PSD. At step S12, range finding is executed in the active AF mode. Specifically, when the LED 8a glows, a steady-state light component is removed from light incident on the sensor array 2b. After the signal light currents ipa and ipb are separated, a ratio of the light current ipa to the light current ipb is calculated in order to detect the incident position of the signal light. Thus, a distance Zc to an object can be calculated by carrying out range finding for active AF.

At step S13, the selection switch SW1 is turned off and the selection switch SW2 is turned on. The resistors 20, 21, and 22 for dividing the level of a current are disconnected from the sensor cells of the sensor array 2b. The outputs of the sensor cells of the sensor arrays 2a and 2b are input to an A/D conversion circuit 4. At step S14, image signals described previously are provided by means of an integration circuit 4a and counter 4b. Thus, a distance to an object, Zd, is obtained by carrying out range finding on the basis of the principles of range finding for passive AF.

At step S15, either the distance to an object, Ac, resulting from ranging finding for active AF or the distance to an object, Zd, resulting from range finding for passive AF is selected as distance information used to focus a camera according to the brightness of an object or the like.

As mentioned above, in the range finder of this embodiment, the sensor array 2b can be functioned as a PSD. According to the known range finding method for active AF employing a bisected sensor, when a spot beam of signal light is deflected from a division point of the bisected sensor, range finding is disabled. According to the range finding method of this embodiment employing the capability of a PSD, range finding can be carried out for objects lying in a wider area. The number of objects which are located in a wide area ranging from a near distance to a far distance and which are difficult to perform range finding will be reduced.

Next, a range finder in accordance with the fourth embodiment of the present invention will be described.

Figure 15:
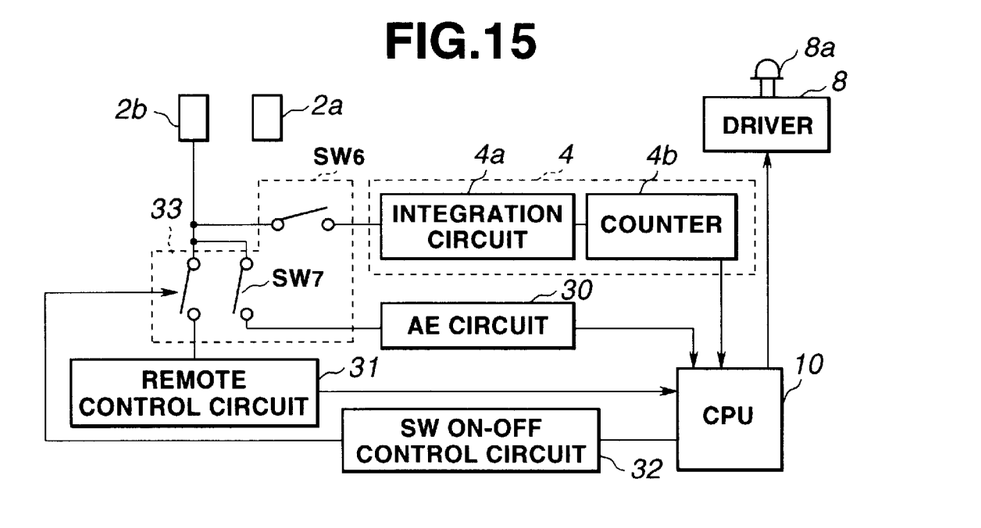
FIG. 15 is a block diagram showing a major portion of a range finder in accordance with the fourth embodiment of the present invention.

The range finder of this embodiment is configured so that the destinations of outputs of a sensor array used for range finding for passive AF, which are light currents, are switched in order to enable, for example, remote control or an automatic exposure (AE) control. FIG. 15 is a block diagram showing a major portion of the range finder having an applied example of the above configuration.

In the range finder shown in FIG. 15, output terminals of a sensor array 2b are connected to a selection switching circuit 33. One of the output terminals is connected to an A/D conversion circuit 4 including an integration circuit via a switch SW6. Another output terminal is connected to an automatic exposure (AE) circuit 30 via a switch SW7. Yet another output terminal is connected to a remote control circuit 31 via a switch SW8. The on-off operation of the selection switching circuit 33 is controlled by a SW on-off control circuit 32 to be driven and controlled by a CPU 10. An output terminal of a sensor array 2a is connected to the A/D conversion circuit 4 including the integration circuit via a switch SW6 that is not shown. The other components are identical to those of the range finder in accordance with the first embodiment. The same reference numerals are assigned to the same components shown in FIG. 15.

In the range finder, when range finding is carried out in a passive AF mode, the selection switch SW6 alone is turned on. Range finding can be carried out in the same manner as that in the range finders of the aforesaid embodiments. For enabling AE control, the selection switch SW7 alone is turned on so that outputs of the sensor array 2a can be supplied to the AE circuit 30. Thus, AE control is enabled. Furthermore, for enabling remote control, the selection switch SW8 alone is turned on. Pulsed signal light used for remote control is projected from the LED 8a under the control of the CPU 10. Reflected light is acquired by the sensor array 2a. Outputs of the sensor array 2a that are light currents are input to the remote control circuit 31, whereby remote control is enabled.

As mentioned above, in the range finder of this embodiment, the destinations of the light currents output from the sensor array used for range finding for passive A are changed using the selection switches. Aside from range finding, AE control and remote control can be enabled. The employment of the range finder enables realization of an inexpensive camera having diverse functions.

As described so far, according to the present invention, there is provided a camera or range finder in which a distance to an object can be measured using output signals of two sensor arrays, and in which since pulsed light current components can be detected in output signals of at least one of the two sensor arrays, range finding can be carried out according to different methods. Consequently, a compact camera or range finder having a simple configuration and capable of properly measuring a distance to even an object lying at a far distance, exhibiting a low luminance, or appearing as a low-contrast image can be provided at low cost.

What is claimed is:

1. A camera having two sensor arrays for detecting two luminance patterns in object images represented by incident light rays propagating along two optical paths, an integrating means for integrating output signals of said sensor arrays, and a range finder for measuring a distance to an object by comparing the two luminance patterns, comprising:

a switching means for isolating output signals of at least one of said two sensor arrays from said integrating means; and a detection circuit for detecting pulsed light current components of the output signals isolated by said switching means.

2. A camera according to claim 1, further comprising a light projecting means for emitting signal light to an object, wherein said detection circuit is a circuit for detecting light current components of signal light emitted by said light projecting means and reflected from the object.

3. A camera according to claim 2, wherein said detection circuit is a range finding circuit for measuring a distance to an object by detecting the incident position of signal light on each sensor array.

4. A camera according to claim 2, wherein said detection circuit is a range finding circuit for measuring a distance to an object by detecting an amount of signal light incident on each sensor array.

5. A camera according to claim 2, wherein output signals of a sensor array are bundled and input as output signals of blocks to said detection circuit via a resisting means.

6. A camera according to claim 1, wherein said detection circuit is a circuit for detecting light current components of signal light projected by an external remote control transmitter.

7. A camera according to claim 1, wherein said detection circuit is a circuit for outputting a signal used to control integration to be performed by said integration circuit.

8. A camera according to claim 1, wherein said detection circuit is a circuit for outputting a signal used to control an exposure value for exposure.

9. A camera having two sensor arrays for detecting two luminance patterns in object images represented by incident light rays propagating along two optical paths, an integration circuit for integrating output signals of said sensor arrays, and a range finder for measuring a distance to an object by comparing the two luminance patterns, comprising:

a light projector, and a switching mechanism that when said light projector glows, isolates output signals of at least one of said two sensor arrays from said integration circuit, and inputs light current components of signal light emanating from said light projector and falling on said sensor arrays to a detection circuit.

10. A camera according to claim 9, wherein said detection circuit is a range finding circuit for measuring a distance to an object by detecting the incident position of the light signal on each sensor array.

11. A camera according to claim 9, wherein said detection circuit is a range finding circuit for measuring a distance to an object by detecting an amount of signal light incident on each sensor array.

12. A camera according to claim 9, wherein the output signals of each sensor array are bundled and input as output signals of blocks to said detection circuit.

13. A camera according to claim 9, wherein said detection circuit is a circuit for detecting light current components of signal light projected by an external remote control transmitter.

14. A range finder using sensor arrays, comprising:

a switching means capable of bundling outputs of each of said sensor arrays as outputs of a plurality of light-receiving surfaces;

a light projecting means for projecting signal light on an object; and a control means for controlling said switching means so as to switch a first range finding mode, in which outputs of said sensor arrays are detected in order to measure a distance to an object, and a second range finding mode in which when said light projecting means projects light, outputs of blocks, into which a sensor array is divided, are detected in order to measure a distance to an object.

15. A range finder according to claim 14, further comprising a monitor circuit for judging the intensity of light reflected from an object and outputting the result of judgment to said control means, wherein when the result of judgment indicates that the object is bright, said control means selects a distance to an object calculated in the first range finding mode; and when the result of judgment indicates that the object is dark, said control means selects a distance to an object calculated in the second range finding mode.

16. A range finder according to claim 15, wherein said monitor circuit judges the intensity of light reflected from an object on the basis of an output of said switching means capable of bundling outputs of each sensor array as outputs of a plurality of light-receiving surfaces.

17. A range finder according to claim 14, wherein said control means executes range finding twice or more times by switching the first range finding mode and second range finding mode, and selects a distance to an object calculated on a stable basis.

18. A range finder according to claim 14, wherein when an object is located at a relatively far distance, said control means selects a distance to an object calculated in the first range finding mode; and when an object is located at a relatively near distance, said control means selects a distance to an object calculated in the second range finding mode.

19. A range finder according to claim 14, wherein when an object appears as a relatively-low-contrast image, said control means selects a distance to an object calculated in the second range finding mode.

20. A range finder according to claim 14, wherein in the second range finding mode, a distance to an object is calculated on the basis of two output currents dependent on the position of light incident on the sensor array.

21. A camera, comprising:

a light projecting means for projecting light on an object;

a light receiving means including a plurality of sensors for receiving light projected by said light projecting means and reflected from the object; and resistive elements, placed among output lines extending from said adjoining sensors, for making it possible to provide two output currents dependent on the position of light incident on said light receiving means.

22. A camera according to claim 21, further comprising an integrating means that when outputs of said light receiving means are not routed to said resistive elements, integrates outputs of said sensors one by one.

23. A camera according to claim 22, further comprising a control means for executing range finding twice or more times in each of a first range finding mode in which a distance to an object is calculated on the basis of the two output currents and a second range finding mode in which a distance to an object is calculated on the basis of outputs of said integrating means, and for selecting a distance to an object calculated on a stable basis.

24. A camera having a range finder including sensor arrays, comprising:

a circuit for bundling signals output from elements constituting one sensor array as one output or dividing the output signals into a plurality of groups and bundling signals belonging to each group as one output.

25. A camera according to claim 24, wherein said circuit includes a switch, and the output destinations of the signals are changed by switching the on and off states of said switch.

26. A camera according to claim 25, wherein the output destinations of the signals which are changed by switching the on and off states of said switch are an active AF circuit, a passive AF circuit, a monitor circuit, and a photometry circuit.

27. A camera having a range finder including sensor arrays, comprising:

a first circuit for bundling signals output from elements constituting one sensor array as one output or dividing the signals into a plurality of groups and bundling signals belonging to each group as one output;

a second circuit for outputting signals output from elements constituting one light-receiving sensor array one by one; and a first switch for selecting either of said first circuit and second circuit.

28. A camera according to claim 27, further comprising a second switch for changing the output destinations of signals provided by said first circuit, wherein the output destinations of signals which are changed by switching the on and off states of said second switch are an active AF circuit, a passive AF circuit, a monitor circuit, and a photometry circuit.

29. A camera, comprising:

a pair of light-receiving sensor arrays used for range finding for passive AF;

a light-projecting device used for range finding for active AF;

a first circuit for outputting pulsating signals contained in output signals provided by at least one of said light-receiving sensor arrays;

a second circuit for outputting output signals of elements constituting a light-receiving sensor array one by one; and a switch for selecting either of said first circuit and second circuit to which output signals of the light-receiving sensor array are output, wherein said switch selects said first circuit for the purpose of range finding for active AF and selects said second circuit for the purpose of range finding for passive AF.

30. A camera according to claim 29, wherein said first circuit has resistive elements placed among lines extending from said adjoining elements.

* * * * *